United States Patent
Hoshiba

(10) Patent No.: US 8,974,965 B2
(45) Date of Patent: Mar. 10, 2015

(54) ELECTRODES FOR A LEAD ACID BATTERY AND THE USE THEREOF

(75) Inventor: Koji Hoshiba, Tokyo (JP)

(73) Assignee: Zeon Corporation, Tokyo (JP)

( * ) Notice: Subject to any disclaimer, the term of this patent is extended or adjusted under 35 U.S.C. 154(b) by 252 days.

(21) Appl. No.: 12/934,229

(22) PCT Filed: Mar. 24, 2009

(86) PCT No.: PCT/JP2009/055821
§ 371 (c)(1),
(2), (4) Date: Sep. 23, 2010

(87) PCT Pub. No.: WO2009/119582
PCT Pub. Date: Oct. 1, 2009

(65) Prior Publication Data
US 2011/0020693 A1    Jan. 27, 2011

(30) Foreign Application Priority Data
Mar. 24, 2008    (JP) .................................. 2008-075541

(51) Int. Cl.
*H01M 4/13*    (2010.01)
*H01M 4/16*    (2006.01)
(Continued)

(52) U.S. Cl.
CPC . *H01M 4/16* (2013.01); *H01M 4/68* (2013.01); *H01M 4/56* (2013.01); *H01M 4/622* (2013.01); *H01M 10/12* (2013.01); *H01M 10/14* (2013.01); *H01M 2010/4292* (2013.01); *Y02E 60/126* (2013.01)
USPC ........................................................ 429/225

(58) Field of Classification Search
CPC ......... H01M 4/56; H01M 4/14; Y02E 60/126
USPC ............................................................ 429/452
See application file for complete search history.

(56) References Cited

U.S. PATENT DOCUMENTS 4,507,855 A *    4/1985    Moseley et al. ............... 29/623.1
2004/0121237 A1    6/2004    Kelley et al.
(Continued)

FOREIGN PATENT DOCUMENTS

DE    1100738 B    3/1961
JP    60-028165 A    2/1985
(Continued)

OTHER PUBLICATIONS

English Machine Translation of Fujita JP08-180858.*
(Continued)

*Primary Examiner* — Ula C Ruddock
*Assistant Examiner* — Lisa S Park Gehrke
(74) *Attorney, Agent, or Firm* — Birch, Stewart, Kolasch & Birch, LLP

(57) ABSTRACT

The object of the present invention is to improve the short-term discharge power after the thermal cycles, as the object of the improvement of the characteristics of the lead acid battery. An electrode for a lead acid battery comprising an electrode active material layer comprising a lead containing material, a porous carbon material and a binder, and a current collector, wherein when a weight of lead atom is A and a weight of porous carbon material is B, B/(A+B)×100 satisfies 1.0 to 90%; and said binder is a crystalline polymer having a melting temperature of 40° C. or less or amorphous polymer, is used.

8 Claims, 1 Drawing Sheet

(51) Int. Cl.
*H01M 4/56* (2006.01)
*H01M 4/62* (2006.01)
*H01M 10/12* (2006.01)
*H01M 10/14* (2006.01)
*H01M 4/68* (2006.01)
*H01M 10/42* (2006.01)

(56) References Cited

U.S. PATENT DOCUMENTS

| 2005/0058907 | A1* | 3/2005 | Kurihara et al. | 429/232 |
| 2006/0269801 | A1* | 11/2006 | Honbo et al. | 429/7 |

FOREIGN PATENT DOCUMENTS

| JP | 02-044648 A | 2/1990 |
| JP | 10-242010 A | 9/1998 |
| JP | 11-045719 A | 2/1999 |
| JP | 2003-51306 A | 2/2003 |
| JP | 2003-331848 A | 11/2003 |
| JP | 2007-12596 A | 1/2007 |
| JP | 2008-47452 A | 2/2008 |
| JP | 2008-146898 A | 6/2008 |
| WO | WO 02/05293 A2 | 1/2002 |
| WO | WO 2005/027255 A1 | 3/2005 |

OTHER PUBLICATIONS

Translation of International Preliminary Report on Patentability and Written Opinion of the International Searching Authority, dated Nov. 9, 2010, for International Application No. PCT/JP2009/055821 (Forms PCT/IB/338, PCT/IB/373 and PCT/ISA/237).

International Search Report PCT/JP2009/055821 dated Jun. 16, 2009.

Extended European Search Report for European Application No. 09725909.7, dated Jun. 29, 2012.

International Preliminary Report on Patentability and Translation of the Written Opinion of the International Searching Authority, dated Apr. 19, 2011, for International Application No. PCT/JP2009/066261 (Forms PCT/IB/373 and PCT/ISA/237).

International Search Report for International Application No. PCT/JP2009/066261 dated Dec. 15, 2009.

Office Action dated May 13, 2013 issued in co-pending U.S. Appl. No. 13/120,132.

* cited by examiner

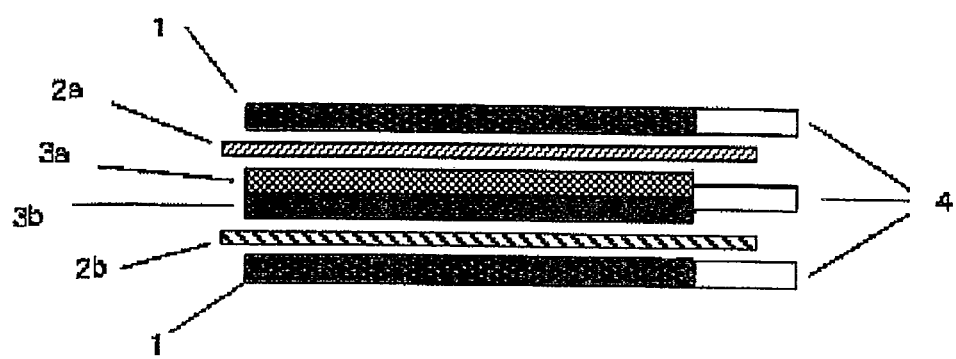

ELECTRODES FOR A LEAD ACID BATTERY AND THE USE THEREOF

TECHNICAL FIELD

The present invention relates to electrodes for an lead acid battery and the lead acid battery using said electrodes.

BACKGROUND ART

The lead acid battery which uses lead dioxide as a positive electrode active material and lead as a negative electrode active material, and uses sulfuric acid aqueous solution as an electrolysis solution is used in various industries since it is suited for cheap and large electrical current discharge compared to other secondary batteries. Even though a large capacity secondary battery such as lithium ion secondary battery holds the present prosperity, the importance of the lead acid battery is not lost, and the lead acid battery is keenly examined to improve its quality even today.

Recently, there are reports of technology using the activated carbon in regards with, the improvement of the large electrical current discharge characteristic during a short period of time which is the advantage of the lead acid battery, and the improvement of the large cycle characteristics of the discharge depth which is the disadvantage.

The patent document 1 describes that the lead acid battery arranging the lead active material layer are arranged on a surface holding a current collector there between, and the activated carbon active material layer coated with the combined paste having the activated carbon, carbon black, carboxymethylcellulose, and neoprene on to opposite surface to the surface having the lead active material layer has good cycle characteristic simulating the typical charge-discharge cycle in regards with secondary battery for 42V mild hybrid electric vehicle.

Also, the patent document 2 describes the electrodes for the lead acid battery formed with the active material layer including the activated carbon, binder and the conductive agent as an electrode active material, on the surface of the lead active material layer, and the lead acid battery comprising said electrodes. The active material layer including the activated carbon, binder and conducting agent is formed by pulverizing the dry kneaded mixture thereof using the cutter mixer, then the obtained pulverized powder material is adhered on to the lead active material layer, followed by applying the pressure; or it is formed by pasting the active material forming composition obtained by mixing the active material, the binder aqueous solution and the conductive agent on to the lead active layer. This lead acid battery comprising the electrode for the lead acid battery provides the lead acid battery which exhibits higher power compared to that of the conventional one.

Also, the patent document 3 describes that the lead acid battery using the negative electrode prepared by filling the negative electrode mixture paste in which 1 to 5 parts by weight of the activated carbon with respect to the negative electrode active material is added to the lead alloy porous body as the current collector, can hold the high voltage after 0.5 seconds of the electric discharge at −15° C.

Patent document 1: WO2005/027255 (corresponding publication: US Patent Publication No. 2007-104981)

Patent document 2: JP-A 2007-12596 (corresponding publication: US Patent Publication No. 2006-269801)

Patent document 3: JP-A-2003-51306

SUMMARY OF THE INVENTION

Technical Problems to be Solved by the Invention

As the object for the improvement of the characteristics of the lead acid battery, for example when it is installed in the vehicle, the power characteristic resistance against the repeating cycle between the high temperature environment and the low temperature environment (hereinafter refer to as thermal cycle), may be mentioned. In case of the method described in the patent documents 1 and 3 with respect to such objective, the problem was that the decline of the power characteristic after the thermal cycles was large. Also, in case of the method described in the patent document 2, the initial power characteristic was not sufficient.

Therefore, the objective of the present invention is to provide the electrode for the lead acid battery superior in the power characteristics resistance against the thermal cycles.

Means for Solving the Technical Problems

The present inventors have found, as a result of keen examination, in case a lead acid battery including the multilayer electrode body stacking the positive electrodes and the negative electrodes via the separator; if an electrode comprised of an electrode active material layer including a lead containing material, a porous activated carbon material and a binder, and a current collector and when the amount of the lead atom included in said electrode active material layer is A, and the amount of the porous activated carbon material is B, then $B/(A+B) \times 100$ is within a predetermined range, and uses a predetermined material as said binder; is used at least in part of said positive electrodes or negative electrodes, then the electrode structure deterioration due to the environment temperature change can be suppressed and the active material can be used effectively. As a result, the power characteristic after the thermal cycles was found to be better, based on these findings the following present invention was completed.

According to the present invention, following [1] to [6] are provided.

[1] An electrode for a lead acid battery comprising an electrode active material layer comprising a lead containing material, a porous carbon material and a binder, and a current collector, wherein when a weight of lead atom is A and a weight of porous carbon material is B, $B/(A+B) \times 100$ satisfies 1.0 to 90%; and said binder is a crystalline polymer having a melting temperature of 40° C. or less or amorphous polymer.

[2] The electrode for the lead acid battery as set forth [1], wherein said electrode active material layer comprises a layer including the lead containing material, and a layer including the porous carbon material and binder.

[3] The electrode for the lead acid battery as set forth in [2], wherein the layer comprising said porous carbon material and said binder is formed by a spherical composite particle.

[4] The electrode for the lead acid battery as set forth in [3], wherein $(L1-Ls)/\{(Ls+L1)/2\} \times 100$ is 20% or less when Ls is a short axis diameter of said spherical composite particle and L1 is a long axis diameter.

[5] The electrode for the lead acid battery as set forth in [3] or [4], wherein said spherical composite particle is produced by obtaining the slurry by dispersing said porous carbon material and the binder in a solvent, and spray drying said slurry.

[6] The lead acid battery including an electrode multilayer body stacking positive electrodes and negative electrodes via separators, and said electrodes for the lead acid battery as set forth in any one of [1] to [5] are used at least in part of said positive electrodes or said negative electrodes.

Effects of the Invention

According to the present invention, the lead acid battery which exhibits the large power even after the thermal cycles, compared to the conventional lead acid battery, may be provided.

BRIEF DESCRIPTION OF THE DRAWINGS

FIG. 1 shows an embodiment of the lead acid battery of an example and a comparative example.

BEST MODE FOR CARRYING OUT THE INVENTION

An electrode for a lead acid battery comprising an electrode active material layer including a lead containing material, a porous carbon material, and a binder, and a current collector; wherein when an amount of lead atoms included in said electrode active material layer is A and an amount of the porous carbon material is B, $B/(A+B) \times 100$ satisfies 1.0 to 90%, and said binder is crystalline polymer or amorphous polymer having a melting point of 40° C. or less.

<The Lead Containing Material>

The lead containing material used in the present invention is a lead and lead compound used as an active material of the usual lead acid battery such as lead dioxide or lead or so. As specific examples of the lead containing material, lead monoxide, dilead trioxide, trilead tetraoxide (red lead), and lead sulfate or so may be mentioned, besides the above mentioned lead dioxide and lead.

These lead containing materials may be used by appropriately selecting said lead containing material alone or as a mixture. As the lead containing material used in the positive electrode, lead dioxide or lead monoxide is preferable, and as the lead containing material used in the negative electrode, lead monoxide or lead is preferable.

<The Porous Carbon Material>

The porous carbon material is used as the electrode active material using the electric double layer capacity. Therefore, it is preferable to have large specific surface area which is normally capable to form boundary surface having larger surface even when the weight is the same. Specifically, the specific surface area is 30 m$^2$/g or more, preferably it is in the range of 500 to 5,000 m$^2$/g, and further preferably within the range of 1000 to 3,000 m$^2$/g.

The porous carbon material is preferably the activated carbon, specifically the activated carbon which the activation treatment has been performed to the phenol resin, rayon, acrylic fiber, pitch, or coconut husk as the carbon material source, may be mentioned. As for the activation treatment, a gas activation using a water vapor, a carbon dioxide and oxygen or so, and a chemical activation using potassium hydroxide or phosphoric acid or so, may be mentioned.

The volume average particle diameter of the porous carbon material is 0.1 to 100 μm, preferably 1 to 50 μm, and further preferably 3 to 35 μm. When the volume average particle diameter is within this range, the casting of the electrode is easy and also the electric double layer capacity becomes high, hence it is preferable. The above mentioned porous carbon material may be used alone or by combining at least two or more thereof. When the electrode active material is combined for use, two or more of the electrode active materials having different average particle diameter or the particle diameter distribution may be combined and used.

<The Binder>

The binder included in the electrode for the lead acid battery of the present invention is a crystalline polymer having melting point of 40° C. or less, or an amorphous polymer. Depending on the molecular structure, the polymer is separated into crystalline polymer which the part of the polymer chain crystallize at a certain temperature range, and an amorphous polymer which does not crystallize at any temperature. The presence of the crystalline of the polymer may be determined by X ray diffraction or so.

The melting point refers to the temperature which the crystalline polymer looses the crystal structure, and usually it is the temperature range above the glass transition temperature of the polymer thereof. The thermal analysis equipment allows determining the temperature of the melting point of the crystalline polymer. Note that, some of the crystalline polymer has low thermal degradation temperature; hence the polymer may thermally degrade before observing the melting point. On the other hand, amorphous polymer does not have melting point.

As for the specific example of the crystalline polymer having the melting point of 40° C. or less, natural rubber, polyisoprene, polysilicone, high cis-polybutadiene or so may be mentioned.

As for the specific example of the amorphous polymer, low cispolybutadiene, butyl rubber (isobutylene-isoprene copolymer), styrene-butadiene copolymer and hydrogenated compound thereof, acrylonitrile-butadiene and hydrogenated compound thereof, acrylate base polymer, polyurethane, ethylene-propylene copolymer having the mole ratio of ethylene and propylene within the range of 3/7 to 7/3, ternary copolymer of ethylene-propylene-diene, chlorosulphonated polyethylene with 35% or more of added amount of chloride, vinylidene fluoride-hexafluoropropylene copolymer, tetrafluoroethylene-perfluorovinylether copolymer, tetrafluoroethylene-propylene copolymer, and polycarbonate or so of highly polymerized compound may be mentioned.

The glass transition temperature of the binder is preferably 60° C. or less, preferably 20° C. or less, and further preferably −20° C. or less, for both the crystalline polymer and amorphous polymer. When the glass transition temperature of the binder is within this range, the output characteristics of the thermal cycles can be improved.

Among the above mentioned, at least one may be selected from a group consisting of polyisoprene, chlorosulphonated polyethylene, ethylene-propylene copolymer, ternary copolymer of ethylene-propylene-diene, and styrene-butadiene copolymer, as the binder since it is superior in the binding and the strength between the current collector.

Above mentioned binder may be used alone or by appropriately combining plurality of said binder.

The amount of the binder in the electrode active material is usually within the range of 1 to 20 parts by weight, and preferably 3 to 15 parts by weight, with respect to 100 parts by weight of the porous carbon material. When the amount of the binder is within this range, it is excellent in the electrode physical property, and the power characteristic after the thermal cycles can be improved.

The electrode active material layer preferably comprises the layer including the lead containing layer (hereinafter referred to as "lead active material layer") and the layer including the porous carbon material and the binder (hereinafter referred to as "porous carbon active material layer"); and the porous carbon active material layer preferably comprises the spherical composite particle. The power characteristic and the electrode productivity of the electric double layer capacity of the porous carbon active material can be improved by forming the electrode active material layer from the lead active material layer and the porous carbon active material layer. Also, as said porous carbon active material layer is formed from the spherical composite particle, the liquid holding capacity of the electrolysis solution which enters the space between the spherical composite particles has connection to improve the power characteristics, however the detailed reason for this is not clear.

<The Spherical Composite Particle>

The spherical composite particle of the present invention refers to the particles in which a plurality of the material, such as the porous carbon material, the binder, and the material described in the following which can be included or so, are spherically formed as one body. As for the spherical composite particle, the porous carbon material, the binder, and the material described in the following as those which can be included only need to form a spherical shape by gathering together, and the porous carbon material, the binder, and the material described in the following as those which can be included does not necessary have to be a spherical shape. The evaluation of whether the composite particle is spherical or not is performed by the value calculated from $(Ll-Ls)/\{(Ls+Ll)/2\}\times 100$ (hereinafter referred to as "spherical degree"), in which Ls is the short axis diameter of the spherical composite particle, and Ll is the long axis diameter. Here, the short axis diameter Ls and the long axis diameter Ll are the average value of the 100 arbitrary composite particles measured by the photographic image of the composite particle observed using the reflection electron microscope. The smaller this value is, the closer the spherical composite particle is to the sphere.

For example, the particle observed as a square in the above mentioned photographic image has the spherical degree calculated as 34.4%; hence the composite particle indicating the spherical degree exceeding 34.4% is at least not spherical shape. The spherical degree of the spherical composite particle used in the present invention is preferably 20% or less, and more preferably 15% or less. The electrode for the lead acid battery formed with the electrode active material layer comprising the spherical composite particle having the spherical degree within this range improves the power characteristic after the deep charge-discharge cycles of the lead acid battery employing said electrode. Since it is formed from the spherical composite particle, the liquid holding capacity of the electrolysis solution which enters the space between the spherical composite particles has connection to improve the power characteristics; however the detail reason for this is not clear.

The particle diameter of the spherical composite particle is usually 1 to 1,000 μm of the volume average particle diameter (D50%), and preferably 10 to 100 μm.

Above mentioned lead containing material is preferably included in said spherical composite particle, besides the porous carbon material and the binder. By including the lead containing material besides the porous carbon material and the binder, the heat history during the thermal cycles can be buffered. Furthermore, other materials may be included as well.

The spherical composite particle may include a conductive agent which aims to improve the conductivity in the active material layer. As specific examples, conductive carbon black such as furnace black, acetylene black, and Ketjenblack (registered trademark of AkzoNobel Corporate), graphite such as natural graphite and artificial graphite, and carbon fibers such as polyacrylonitrile base carbon fiber, pitch base carbon fiber and air phase carbon fiber may be mentioned. Among these, the conductive carbon black is preferable, and acetylene black and Ketjenblack are more preferable.

The volume average particle diameter of the conductive agent is preferably smaller than that of the electrode active material, and usually it is within the range of 0.001 to 10 μm, preferably 0.05 to 5 μm, and more preferably 0.01 to 1 μm. When the particle diameter of the conductive agent is within this range, a higher conductivity can be obtained with less used amount. These conductive agents may be used alone respectively or by combining two or more thereof.

The amount of the conductive agent is usually within the range of 1 to 20 parts by weight, and preferably 3 to 15 parts by weight with respect to 100 parts by weight of the porous carbon material. When the amount of the conductive agent is within this range, then it is excellent in the conductivity and can improve the power characteristic after the cycles.

Also, a dispersing agent which aims to disperse the porous carbon material in the slurry may be included during the manufacturing process of the spherical composite particle described in the following. As for the specific example of the dispersing agent, cellulose base polymer such as carboxymethylcellulose, methylcellulose, ethylcellulose, hydroxypropylcellulose and hydroxypropylmethylcellulose or so, ammonium salts and alkali metal salts thereof; ammonium salts and alkali metal salts of polyacrylic acid or polymethacrylic acid; ammonium salts and alkali metal salts of polyacrylic acid, polyvinyl alcohol, polyethylene oxide; polyvinylpyrolidone, polycarboxylic acid, oxidized starch, phosphorus starch, casein, various modified starch, chitin, and chitosan derivative or so may be used. These dispersing agents may be used alone or by combining two or more thereof. Among these, cellulose base polymer is preferable and carboxymethylcellulose or ammonium salts and alkali metal salts thereof are particularly preferable as the dispersing agent. The used amount of the dispersing agent is not particularly limited; however it is usually within the range of 0.1 to 10 parts by weight, preferably 0.5 to 5 parts by weight, and more preferably 0.8 to 2.5 parts by weight with respect to 100 parts by weight of the porous carbon material. By using the dispersing agent, precipitation or coagulation of the solid parts in the slurry can be suppressed.

The porous carbon active material layer may comprise other additives depending on the needs. Specifically, a surfactant such as an anionic, a cationic, a nonionic, or an amphoteric nonionic anion or so may be mentioned as those aiming to improve the stability of the electrode composition such as slurry which will be described in the following.

The manufacturing method of the spherical composite particle is not particularly limited, however it is preferable as long as the manufacturing method comprises the steps of obtaining the slurry by dispersing the porous carbon material described in the followings, and spray drying said slurry; since the spherical composite particle having a small value of the spherical degree (close to the sphere) can be obtained in good productivity.

<The Step for Obtaining the Slurry>

In the step for obtain the slurry, the above mentioned porous carbon material, also the conductive agent, the binder, the dispersing agent which are added depending on the needs, and other additives are dispersed or dissolved in the solvent, then these are further dispersed or dissolved; thereby the slurry is obtained.

The solvent used for obtaining the slurry is not particularly limited, however when using the above mentioned dispersing agent, the solvent which is capable to dissolve the dispersing agent is preferably used. Specifically, although water is normally used, an organic solvent can be used, and also the mixed solvent of water and the organic solvent can be used as well. Also, sulfuric acid which is the electrolysis solution of the lead acid battery may be added to control pH.

The amount of the solvent when preparing the slurry usually has the solid portion concentration of the slurry within the range of 1 to 70 weight %, preferably 15 to 60 weight %. When the solid portion concentration is within this range, it is preferable since the binder disperses uniformally.

The viscosity of the slurry is normally within the range of 10 to 5,000 mPa·s, and preferably 50 to 2,000 mPa·s at a room temperature. When the viscosity of the slurry is within this range, the productivity can be increased during the spray drying particle forming step.

The method and the order of dispersing or dissolving the porous carbon material, as well as the conductive agent, the binder, the dispersing agent and the additive thereof to the solvent are not particularly limited, and for example, the method of mixing by adding these at once into the solvent; the method in which the dispersing agent is dissolved in the solvent followed by adding the binder which is dispersed in the solvent then at the end adding the porous carbon material and the conducting agent for mixing; and the method in which the porous carbon material and the conductive agent is added in to the binder which is dispersed in the solvent and mixed, then adding this mixture to the dispersing agent dissolved in the solvent and mixed, may be mentioned. As for the mixing means, for example the mixing apparatus such as a ball mill, a sand mill, a beads mill, a pigment dispersing apparatus, a grinder, an ultrasonic sound dispersing apparatus, a homogenizer, a homomixer, and a planetary mixer or so may be mentioned. The mixing is usually performed within the range of room temperature to 60° C. for 10 minutes to several hours.

<The Spray Drying Step>

Next, the slurry is spray dried to granulate. The spray drying method is a drying method which sprays the slurry into the hot air. As for the apparatus used for spraying the slurry, an atomizer may be mentioned. The atomizer has two types of the apparatus which are the rotating disk system and the compression system. The rotating disk system is the system which the slurry is introduced into approximately the center of the disk rotating in a high speed, and the slurry is sprayed when the slurry is released out of the disk due to the centrifugal force of the disk. The rotation speed of the disk depends on the size of the disk, however usually it is 5,000 to 30,000 rpm and preferably 15,000 to 30,000 rpm. The lower the speed of the disk is, the larger the drops of the spray become, and hence the primary average volume particle diameter of the spherical composite particle becomes large. As for the atomizer of the rotating disk system, a pin type and a vane type may be mentioned; however the pin type is preferable. The pin type atomizer is one type of the centrifugal spraying apparatus using the spraying disk, wherein said spraying disk constituted by a plurality of spraying rollers which is mounted between a top-bottom mounting disks in freely removable manner on approximately concentric circle along the peripheral of the top-bottom mounting disk. The slurry is introduced from the center of the spraying disk, and adhered to the spraying rollers by centrifugal force, then moves towards the outside on the surface of the rollers, and finally the slurry is released from the surface of the rollers to be sprayed. On the other hand, the compression system is a system in which the slurry is compressed and dried by atomizing from the nozzle.

The temperature of sprayed slurry which is sprayed is normally at the room temperature; however it may be higher than the room temperature by heating. Also, the hot air temperature during the spray drying, is usually 80 to 250° C., and preferably 100 to 200° C. In the spray drying method, the introduction of the hot air is not particularly limited, and for example, a system in which the hot air and the spray direction is parallel in the transverse direction; a system in which it is sprayed at the top of the drying tower and runs down together with the hot air; a system in which the sprayed drops and the hot air contacts by counter flowing; and a system in which the sprayed drops initially flows in parallel with the hot air then falls down due to the gravity and contacts by counter flowing or so may be mentioned.

The spherical composite particle obtained by above mentioned manufacturing method may be performed with the after-treatment after manufacturing the particle, depending on the needs, as long as it does not exceed the spherical degree of 20%. As for the specific example, by mixing the above mentioned porous carbon agent, the conductive material, the binder, or the additives or so to the spherical composite particle, the property of the particle surface is changed so that it to improve or lower the fluidity of the spherical composite particle, to improve the property of the continuous press casting, to improve the electric conductivity of the spherical composite particle, and to suppress the gas production when the lead acid battery is working, or so can be done.

<The Spherical Composite Particle Layer Forming Step>

The spherical composite particle layer may be formed by dispersing the spherical composite particle on the current collector or on other layer then press casting; and also the spherical composite particle may be casted to a sheet shape active material layer alone by press casting then it may be pasted on the current collector.

In case the spherical composite particle is first casted to a sheet shape and then press adhered, a roll press casting is preferable as a method for obtaining the sheet shape casting. The temperature during the casting is usually 0 to 200° C., it is preferably higher than the melting point or the glass transition temperature of the binder of the spherical composite particle, and further preferably it is 20° C. or higher than the melting point or the glass transition temperature. As for the roll press casting, the casting speed is usually within the range of 0.1 to 20 m/min, and preferably 5 to 10 m/min. The press line pressure between the rolls is usually 0.2 to 30 kN/cm and preferably 3 to 15 kN/cm.

It may be further pressurized depending on the needs in order to remove the unevenness of the casted electrodes, and to have higher capacity by increasing the density of the porous carbon active material layer.

The lead active material layer refers to the layer which is mainly lead and lead compound such as above mentioned lead dioxide and lead which are used as the active material of the normal lead acid battery. The ratio of the lead atom in the lead active material layer is usually 50 weight % or more and preferably 70 weight % or more with respect to the weight of the whole layer. When the amount of the lead is within this range, the energy density of the electrode active material layer can be increased.

The lead active material layer may include, besides the lead containing material, a strengthening material such as polyester fiber, surfactant such as lignin, and barium sulfate or so. Also, additives selected from oxides, hydroxides, or sulfate of antimony, zinc, cadmium, silver and bismuth may be used. Furthermore, in case of forming the lead active material by preparing the lead containing material paste, sulfuric acid aqueous solution may be added as well.

<The Method for Forming the Lead Active Material Layer>

The method for forming the lead active material layer is same as the conventionally known method of manufacturing the electrode for the lead acid battery, that is the lead active material layer can be formed by preparing the paste by adding the solvent and the additives to the lead containing material, then filling over the grid shape current collector.

What is meant by the electrode active material layer is formed by the layer comprising the lead containing material and the porous carbon active material layer, is that the above mentioned lead active material layer is placed so that the electric conductivity can be made with the current collector mentioned in the following. As for the examples, when using the grid shape current collector, the lead active material layer is formed at a part of a grid plane of the grid shape current collector then the porous carbon active material layer is formed on the rest of the grid plane; or the lead active material layer is formed on the entire surface of the grid of the grid shape current collector, then on the portion thereof or on the entire surface thereof, the porous carbon active material layer may be placed or so may be mentioned. Among these, it is preferable to form the lead active material layer on the entire surface of the grid of the grid shape current collector, then on the portion thereof or on the entire surface thereof, the porous carbon active material layer is placed.

<The Stacking Method of the Two Active Material Layers>

It is necessary that the lead active material layer and the porous carbon active material layer have an electric conductivity. Therefore, these layers are preferably pressure adhered. For example, the spherical composite particle may be press casted after dispersing evenly on the lead active material layer filled in the grid shape current collector by the above mentioned method of forming the lead active material layer; or the press casting may be done after casting the above mentioned sheet shape porous carbon active material layer alone.

In the electrode for the lead acid battery of the present invention, when the weight of the lead atom included in the electrode active material layer is A, and the weight of said porous carbon active material is B, $B/(A+B) \times 100$ is preferably within the range of 1.0% to 90%. More preferably, $B/(A+B) \times 100$ is within the range of 1.0% to 50%, and further preferably 3.0 to 15%. When $B/(A+B) \times 100$ is within this range, the power of the lead acid battery as a whole can be improved by the good electric double layer capacity having good response property of the porous carbon material and the faraday capacity of the lead containing material. Here, $B/(A+B) \times 100$ calculates the total weight of all of the lead atoms included in the electrode active material layer and the total weight of the porous carbon material as A and B respectively. A does not include the weight of the lead atoms included in the current collector.

<The Current Collector>

The current collector used in the present invention is to allow the electric conductivity of the porous carbon material and the lead containing material as the electrode active material to the out side of the lead acid battery. As for the current collector, a plate shape, a foil shape, the porous tube inserted in the lead alloy metal core which is called a clad type, and the grid shape current collector may be mentioned. Among these, the grid shape current collector is preferable from the point of view that it has excellent maintenance and current collecting property of the electrode active material layer. As for the grid shape current collector, any of the standard gird, the radial gird, and the expending type can be used.

As for the material of the grid shape current collector, the lead containing alloy such as a lead-calcium alloy, a lead-antimon alloy, a lead-tin alloy, or so may be used. As a part of said lead alloy composition, arsenic, tin, copper, silver and aluminum or so may be included.

The lead acid battery of the present invention includes an electrode multilayer body staking the positive electrodes and the negative electrodes via the separator, wherein the above mentioned electrodes for the lead acid battery of the present invention is used at least in a part of said positive electrodes or the negative electrodes.

Normally, the lead acid battery comprises a plurality of pair of electrodes which are placed so that the positive electrodes and the negative electrodes face via the separator, and the each of the positive electrodes and the each of the negative electrodes are respectively structured to have a short circuit. By having such a structure, the capacity of the lead acid battery is enlarged. In the lead acid battery of the present invention, the electrodes for the lead acid battery of the present invention can be used to all of the both electrodes of the positive electrodes and the negative electrodes; or it may be used to all of the electrodes either the positive electrodes and the negative electrodes. Alternatively, the electrodes for the lead acid battery of the present invention can be used to a part of the positive electrodes or a part of negative electrodes. Among these, it is preferably used in all of the negative electrodes, or in a part of the negative electrode.

In the lead acid battery of the present invention, as for the structure elements other than said electrode multilayer body, an electrolysis solution and the battery case storing thereof and the lid may be mentioned, as similar to the usual lead acid battery.

<The Separator>

As for the separator used in the lead acid battery of the present invention, a paper yarn, a microporous polyethylene, a microporous polypropylene, a microporous rubber, a retainer mat, a glass mat or so of the separator may be used alone or by combining plurality thereof.

<The Electrolysis Solution>

The electrolysis solution used in the lead acid battery of the present invention is usually sulfuric acid aqueous solution. The density of the sulfuric acid fluctuates depending on the charge-discharge status; however the density is preferably 1.25 to 1.30 g/cm$^3$ (20° C.) in a fully charged status after the chemical conversion treatment of the lead acid battery.

<The Battery Case and the Lid>

In the lead acid battery of the present invention, as for the battery case and the lid storing pairs of the electrodes placed so that the positive electrodes and the negative electrodes face each other via the separator, that of conventionally known ones are used. As for specific examples, those using ethylene-propylene copolymer, polyethylene, polypropylene, poly-acrylonitrile-stylene copolymer, and polyacrylonitrile-buta-diene-stylene copolymer, as a source may be used.

<The Assembled Battery>

As similar to the conventionally known lead acid battery, the lead acid battery having the structure comprising the above mentioned plurality of electrode pairs wherein each of the positive electrodes and each of the negative electrodes are structured to have a short circuit, can be connected in series circuit by preparing plurality thereof. By doing so, the electromotive force of the lead acid battery as a whole, can be enlarged. There is no need to prepare plurality of battery bath in order to connect in series circuit. It is possible to manufacture the integrated lead acid battery having high electromotive force can be obtained, if plurality of partition is provided in one battery bath, and placing the electrode pairs into each partition thereof, then connecting these in series circuit.

EXAMPLE

Hereinafter, the present invention will be further described using the examples and the comparative examples. However, the present invention is not to be limited thereto. Note that, "part" and "%" in the examples and the comparative examples are based on the weight unless other wise mentioned.

The measurement and the evaluation of the examples and the comparative examples are performed as described in the followings.

(The Degree of Sphericity)

The evaluation of degree of sphericity of the spherical composite particle is performed as described in the followings.

For 100 arbitrary spherical composite particles measured by the photograph of the obtained spherical composite particles observed using the reflection electron microscope, each degree of sphericity (%) was obtained by calculating the equation of $(Ll-Ls)/\{(Ls+Ll)/2\}\times 100$, in which the Ls is the short axis diameter, and Ll is the long axis diameter. The degree of sphericity of the observed spherical composite particle is the average value of the obtained 100 thereof. The smaller this value is, the closer to the sphere the spherical composite particle is.

(The Average Particle Diameter)

As for the average particle diameter of the spherical composite particle, Simazu Corporation manufactured Laser Diffraction Particle Size Analyzer SALD-3100 and the Injection Type Dry Measurement Unit DS-21 were used, and the particle diameter of 50% cumulative frequency based on the volume particle size distribution measured at 23° C. was defined as the average particle diameter.

(The Melting Point and the Glass Transition Temperature of the Binder)

The melting point and the glass transition temperature (Tg) of the binder is determined by the peak point of the heat absorption curve of the differential scanning calorimeter (DSC).

(The Power Characteristics)

The voltage after 0.2 seconds of the electric discharge at 20 CA from 2.2 V of a charging voltage at 25° C. of the multilayer lead acid battery was measured and was set as the power before the thermal cycles. Here, 20 CA refers to the electric current flow for discharging the capacity of the manufactured secondary battery in 1/20 hours.

Next, under the condition of −20° C., this lead acid battery was discharged until the voltage was 1.7V by applying the electrical current of 2 CA from full charge until SOC 70%; then it was recharged until 2.2V by applying electrical current of 2 CA. Here, "SOC 70%" refers to the condition in which 70% of the capacity is left with respect to 100% capacity of the fully charged lead acid battery. Then, the temperature was raised to 25° C., and discharged and charged under the condition performed at −20° C. These discharging and the charging at −20° C. and 25° C. is set as 1 cycle, and total of 10 cycles of these were carried out.

Then, the voltage after 0.2 seconds of the electric discharge at 20 CA from 2.2 V of charging voltage at 25° C. of the multilayer lead acid battery is measured and the power after the thermal cycles is measured. (The power after the thermal cycles)/(the power before the thermal cycles) is set as cycle retention rate.

Example 1

(The Positive Electrode Manufacture)

10 parts of ion-exchange water, 10 parts of diluted sulfuric acid having gravity of 1.27 was added to 100 parts of lead oxide as the lead containing material and mixed to manufacture the positive electrode active material mixture paste. After filling this paste to the grid shape current collector (100 mm×100 mm×3 mm) formed by lead-calcium alloy, it was matured for 24 hours at 40° C. under the atmosphere of 95% moisture, then the positive electrode was formed by drying. $B/(A+B)\times 100$ of this positive electrode is 0%.

(The Negative Electrode Manufacture)

0.3 parts of carbon black as the conductive agent, 0.3 parts of barium sulfate, 10 parts of ion-exchange water, 10 parts of diluted sulfuric acid having gravity of 1.36 was added to 100 parts of the lead oxide as the lead containing material, and mixed to obtained the paste. The obtained paste was made into sheet shape lead oxide paste having the thickness of 2,750 μm using the fixed gap roll. This sheet shape lead oxide paste was filled to the grid shape current collector (100 mm×100 mm×3 mm) formed by lead-calcium alloy, thereby the lead active material layer was formed.

100 parts of the water vapor activation activated carbon having specific surface area of 1,700 m$^2$/g as the porous carbon material, 5 parts of carbon black, 1.5 parts of carboxymethyl cellulose sodium salts, and 10 parts of aqueous dispersion of chlorosulfonated polyethylene in terms of solid content were mixed, then the ion-exchange water was added so that the solid content concentration becomes 20%, and dispersion mixing was performed to obtain the slurry. By using the spray drier, this slurry was spray dry granulated using the atomizer (diameter of 65 mm) of the rotating disk system having the rotation speed 25,000 rpm, hot air temperature of 150° C., and the particle collecting outlet at 90° C., thereby the spherical composite particle was obtained. The degree of sphericity of this spherical composite particle was 10%, and the average volume particle diameter was 62 μm. The obtained spherical composite particle was sheet molded using the heated pressure roll (molding speed 15 m/min, line pressure 5 kN/cm) at 100° C. Thereby the sheet shape molding having thickness of 250 μm and density of 0.6 g/cm$^3$ was obtained. This sheet shape molding was adhered by pressure at 10 MPa and 100° C. to the surface of the grid shape current collector filled with said paste using the batch press, and formed the porous carbon active material layer to manufacture the negative electrode. $B/(A+B)\times 100$ of this negative electrode was 1.4%.

Using the above mentioned positive electrode and the negative electrode, the multilayer lead acid battery shown in FIG. 1 is manufactured. As for the separator, the separator 2a made of a glass microfiber was placed in between the lead active material layer 3a and the positive electrode 1; and the separator 2b made of microporous polypropylene was placed in between the porous carbon active material layer 3b and the positive electrode 1. As for the electrolyte solution, diluted sulfuric acid having the gravity of 1.225 (20° C.) was used. After performing the chemical conversion treatment by carrying out the excess charging, the lead acid battery was obtained by controlling the density of the electrolyte solution to be 1.28 g/cm$^3$ using the sulfuric acid having the density of 1.4 g/cm$^3$. The power characteristic before and after the thermal cycles of this lead acid battery was evaluated.

Example 2

The negative electrode and the lead acid battery were obtained as same as the example 1 except for; making the thickness of the sheet shape lead oxide paste to 2,500 μm, instead of the aqueous dispersion of chlorosufonated polyethylene, the aqueous dispersion of polyisoprene was used as the binder for manufacturing the spherical composite particle, and obtaining the sheet molding having the thickness of 500 μm by roll press casting the obtained spherical composite particle at the casting speed of 10 m/min. When calculating B/(A+B)×100 of this negative electrode, it was 3.1%. The power characteristic before and after the thermal cycles of this lead acid battery was evaluated.

Example 3

The negative electrode and the lead acid battery were obtained as same as the example 1 except for; making the thickness of the sheet like lead oxide paste to 1,500 μm, instead of the aqueous dispersion of chlorosufonated polyethylene, the aqueous dispersion of ethylene-propylene-diene ternary copolymer was used as the binder for manufacturing the spherical composite particle, and obtaining the sheet molding having the thickness of 1,500 μm by roll press casting the obtained spherical composite particle at the casting speed of 4 m/min. When calculating B/(A+B)×100 of this negative electrode, it was 13.7%. The power characteristic before and after the thermal cycles of this lead acid battery was evaluated.

Example 4

The negative electrode and the lead acid battery were obtained as same as the example 1 except for; making the thickness of the sheet like lead oxide paste to 500 μm, instead of the aqueous dispersion of chlorosufonated polyethylene, the aqueous dispersion of carboxy modified styrene-butadiene copolymer was used as the binder for manufacturing the spherical composite particle, and obtaining the sheet molding having the thickness of 2,500 μm by roll press casting the obtained spherical composite particle at the casting speed of 2 m/min. When calculating B/(A+B)×100 of this negative electrode, it was 44.3%. The power characteristic before and after the thermal cycles of this lead acid battery was evaluated.

Example 5

The negative electrode and the lead acid battery were obtained as same as the example 1 except for; making the thickness of the sheet like lead oxide paste to 100 μm, instead of the aqueous dispersion of chlorosufonated polyethylene, the aqueous dispersion of high styrene content styrene-butadiene copolymer was used as the binder for manufacturing the spherical composite particle, and obtaining the sheet molding having the thickness of 2,900 μm by roll press casting the obtained spherical composite particle at the casting speed of 0.7 m/min. When calculating B/(A+B)×100 of this negative electrode, it was 82.2%. The power characteristic before and after the thermal cycles of this lead acid battery was evaluated.

Comparative Example 1

100 parts of lead oxide, 0.060 parts of polyester fiber, 0.493 parts of barium sulfate, 0.026 parts of carbon black, 7.98 parts of the diluted sulfuric acid having the density of 1.400 (20° C.), and 11 parts of water were mixed; and then filled into the grid shape current collector (100 mm×100 mm×3 mm) so that the thickness becomes 1,720 μm. The water was added to the mixture having 20 parts of carbon black having the specific surface area of 60 m²/g, 7.5 parts of carboxymethyl cellulose, 7.5 parts of polychloroprene, and 65 parts of activated carbon (manufactured by KURARAY CHEMICAL CO., LTD) having the specific surface area of 2,000 m²/g; then these were coated to the surface of said grid shape current collector using the paste coating so that the thickness becomes 1,280 μm thereby the negative electrode was obtained. The obtained negative electrode had B/(A+B)×100 of 7.8%. Besides using this negative electrode, the lead acid battery was obtained as same as the example 1, and the power characteristic before and after the thermal cycles was evaluated.

Comparative Example 2

100 parts of lead, 0.3 parts of lignin, 0.2 parts of barium sulfate, and 0.1 parts of carbon powder were added and the polyester fiber was added thereto then kneaded for 10 minutes by a kneader to obtain the mixture. 12 parts of water was added to the obtained mixture, and 13 parts of sulfuric acid having the density of 1.26 g/cm³ (20° C.) was further added to prepare the negative electrode active material paste. This paste was filled to the grid like current collector (100 mm×100 mm×2.0 mm), and left for 18 hours under the atmosphere having the humidity of 98 RH % and the temperature of 50° C. for maturation, then left for 2 hours at the temperature of 110° C. for drying.

80 parts of the activated carbon powder having the specific surface area of 1,700 m²/g and 15 parts of the acetylene black having the specific surface area of 65 m²/g were weighted and mixed well, then 5 parts of polytetrafluoroethylene was added for dry kneading. This was pulverized by the cutter mixer to obtain the powder. This powder has average particle diameter of 161 μm, and the spherical degree of 43%. The obtained powder was adhered to the one side of said negative electrode filled body using the hydraulic press with the pressure of 50 MPa to obtain the negative electrode. Note that, the amount of the powder is controlled so that B/(A+B)×100 of the negative electrode is 0.7%. Besides using this negative electrode, the lead acid battery was obtained as same as the example 1, and the power characteristic before and after the thermal cycles was evaluated.

Comparative Example 3

100 parts of lead oxide as the lead containing material, 3.0 parts of carbon black as the conductive material, 5.0 parts of the phenol base activated carbon fiber, 0.3 parts of barium sulfate, 10 parts of the ion-exchange water, and 10 parts of the diluted sulfuric acid having the gravity of 1.36 were mixed to obtain the paste. The obtained paste is filled into the grid shape current collector consisting of lead-calcium alloy to manufacture the negative electrode. Besides for using this negative electrode, the lead acid battery was produced as same as the example 1. However, the separator made of glass microfiber was used for all the separators. B/(A+B)×100 of the negative electrode is 4.8%. The power characteristic before and after the thermal cycles was evaluated.

Hereinbefore, the degree of sphericity (excluding the comparative examples which was not able to measure), the melting point and the glass transition temperature of the binder, and power characteristic before and after the thermal cycles of the examples and the comparative examples are shown in Table 1. For the power characteristic, the initial power characteristic before the thermal cycles as described in the above are shown as the relative value to the power characteristic of the comparative example 1. The power characteristics after the thermal cycles are shown respectively as the relative value with respect to the power characteristics before the thermal cycles. The larger the value is, the better the power characteristics are in both cases of before and after the thermal cycles.

TABLE 1

| | B/(A + B) × 100 | Degeree of sphericity | Binder melting point | Binder Tg | Power characteristic before the thermal cycles | Cycle retention rate |
|---|---|---|---|---|---|---|
| Example 1 | 1.4% | 10% | — | −34° C. | 101% | 87% |
| Example 2 | 3.1% | 11% | 28° C. | −70° C. | 104% | 92% |
| Example 3 | 13.7% | 10% | — | −54° C. | 108% | 91% |
| Example 4 | 44.3% | 12% | — | 12° C. | 106% | 88% |
| Example 5 | 82.2% | 10% | — | 58° C. | 103% | 83% |
| Comparative example 1 | 7.8% | — | 42° C. | −44° C. | 100% | 76% |
| Comparative example 2 | 0.7% | 43% | — | −34° C. | 97% | 81% |
| Comparative example 3 | 4.8% | — | — | — | 104% | 78% |

In the comparative example 1, polychloroprene and carboxymethyl cellulose which are crystalline polymer are used. The melting point of polychloroprene is 42° C. Although, carboxymethyl cellulose is crystalline, the melting point couldn't be determined, since the thermal degradation of the polymer starts before the melting point measurement by the above DSC measurement. As these are used as the binder, the power characteristic after the thermal cycles is bad.

In the comparative example 2, since B/(A+B)×100 is less than 1.0%, hence the initial power characteristic and also the cycle maintaining ratio are bad.

In the comparative example 3, the cycle maintaining ratio is bad since the binder is not used.

Industrial Applicability

The electrodes for the lead acid battery and the lead acid battery using thereof according to the present invention has good power characteristics after the thermal cycles; thus it can preferably used as the lead acid battery for use which are placed out door with significant temperature difference such as car equipment use, or for electricity storage use such as a voltage sag corrector, an uninterrupting power supply use, a wind power supply use, and a solar power supply use.

Explanation of the Notes

1: positive electrode active material layer
2a: glass microfiber separator
2b: microporous polyethylene separator
3a: lead active material layer
3b: porous carbon active material layer
4 grid like current collector

The invention claimed is:

1. An electrode for a lead acid battery comprising an electrode active material layer comprising a lead containing material, a porous carbon material and a binder, and a current collector, wherein
when a weight of lead atom is A and a weight of porous carbon material is B, B/(A+B)×100 satisfies 3.0 to 90%;
said binder is a crystalline polymer having a melting temperature of 40° C. or less or amorphous polymer; and
said electrode active material layer comprises a layer including the lead containing material, and another layer including the porous carbon material and binder.

2. The electrode for the lead acid battery as set forth in claim 1, wherein the layer comprising said porous carbon material and said binder is formed by a spherical composite particle.

3. The electrode for the lead acid battery as set forth in claim 2, wherein (Ll-Ls)/{(Ls+Ll)/2}×100 is 20% or less when Ls is a short axis diameter of said spherical composite particle and Ll is a long axis diameter.

4. The electrode for the lead acid battery as set forth in claim 2 or 3, wherein said spherical composite particle is produced by obtaining the slurry by dispersing said porous carbon material and the binder in a solvent, and spray drying said slurry.

5. The lead acid battery including an electrode multilayer body stacking positive electrodes and negative electrodes via separators, and said electrodes for the lead acid battery as set forth in claim 1 are used at least in part of said positive electrodes or said negative electrodes.

6. The electrode for the lead acid battery as set forth in claim 1, wherein B/(A+B)×100 satisfies 3.0 to 50%.

7. The electrode for the lead acid battery as set forth in claim 1, wherein B/(A+B)×100 satisfies 3.0 to 15%.

8. The electrode for the lead acid battery as set forth in claim 1, wherein a specific surface area of the porous carbon material is 30 m$^2$/g or more.

* * * * *